United States Patent [19]

Vanderbei

[11] Patent Number: 4,885,686

[45] Date of Patent: Dec. 5, 1989

[54] METHODS AND APPARATUS FOR EFFICIENT RESOURCE ALLOCATION

[75] Inventor: Robert J. Vanderbei, Red Bank, N.J.

[73] Assignee: American Telephone and Telegraph AT&T Bell Laboratories, Murray Hill, N.J.

[21] Appl. No.: 2,371

[22] Filed: Jan. 12, 1987

[51] Int. Cl.$^4$ ............... G06F 15/20; H04Q 3/66; H04M 7/00

[52] U.S. Cl. ............... 364/402; 379/113; 379/221; 340/825.28

[58] Field of Search ............... 364/402; 379/113, 221; 340/825.28

[56] References Cited

U.S. PATENT DOCUMENTS

| | | | |
|---|---|---|---|
| 4,345,116 | 8/1982 | Ash et al. | 379/221 |
| 4,669,113 | 5/1987 | Ash et al. | 379/221 |
| 4,704,724 | 11/1987 | Kirshnan et al. | 379/221 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |

OTHER PUBLICATIONS

"A New Polynomial-Time Algorithm for Linear Programming", Combinatorica, vol. 4, N. Karmarkar, 1984, pp. 373–395.

"An Extension of Karmarkar's Algorithm for Linear Programming Using Dual Variables", Technical Report No. 648, Cornell University College of Engineering, Todd et al., Jan. 1985.

"Efficient Implementation of a Class of Preconditioned Conjugate Gradient Methods", SIAM J. Sci. Stat. Comput., vol. 2, No. 1, S. C. Eisenstat, Mar. 1981.

"Some Computational Experience and a Modification of the Karmarkar Algorithm", ISME Working Paper 85-105, Pennsylvania State University, Cavalier et al., Feb. 1985.

"A Variation on Karmarkar's Algorithm for Solving Linear Programming Problems", IBM T. J. Watson Research Center, Earl R. Barnes.

"On Projected Newton Barrier Methods for Linear Programming and an Equivalence to Karmarkar's Projective Method", Technical Report SOL 85-11, Systems Optimization Laboratory, Stanford University, Gill et al., Jul. 1985.

Primary Examiner—Allen MacDonald
Attorney, Agent, or Firm—Henry Brendzel; Robert O. Nimtz

[57] ABSTRACT

A method and apparatus for optimizing resource allocations is disclosed which utilizes the Karmarkar algorithm to proceed in the interior of the solution space polytope. The constraints on the allocation variables (the surfaces of the polytope) are partitioned into sparse and non-sparse partitions to permit applying a perturbation formula permitting rapid inversion of the resulting perturbed matrix products. Each successive approximation of the solution point, and the polytope, are normalized such that the solution point is at the center of the normalized polytope using a diagonal matrix of the current solution point, also partitioned into sparse and non-sparse portions. The objective function is then projected into the normalized space and the next step is taken in the interior of the polytope, in the direction of steepest-descent of the objective function gradient and of such a magnitude as to remain within the interior of the polytope. The process is repeated until the optimum solution is closely approximated.

The resulting algorithm steps are advantageously applied to linear programming problems which involve allocations which are simultaneously dependent on a large number of constraints, problems which might other wise involve excessive amounts of computation time.

11 Claims, 4 Drawing Sheets

KARMARKAR ALGORITHM
(PRIOR ART)

KARMARKAR ALGORITHM
(PRIOR ART)

METHODS AND APPARATUS FOR EFFICIENT RESOURCE ALLOCATION

TECHNICAL FIELD

This invention relates to systems for using the Karmarkar algorithm for resource allocation among a plurality of resource utilizers, and, more particularly, to the use of partitioning techniques for allocations including values heavily constrained by a large number of simultaneously operative constraints, thereby to improve the speed and efficiency of the Karmarkar algorithm.

BACKGROUND OF THE INVENTION

The need for resource allocation decisions arises in a broad range of technological and industrial areas such as the assignment of transmission facilities in telephone transmission systems, the control of the product mix of a factory, the deployment of industrial equipment, inventory control, and others. Resource allocation in this context means, in general, the deployment of specific technological or industrial resources for the production of particular technological or industrial results.

Resource allocation decisions are typically subject to constraints on such allocations. Resources are always limited in overall availability, and, furthermore, the usefulness of a particular resource in some particular application may also be limited. For example, the traffic-carrying capacity of each individual link in a telecommunications system is limited, while the overall traffic offered to the communications system is also limited. Each particular allocation of resources can be associated with a "payoff," i.e., a cost of that allocation or an allocation benefit (e.g., profit). The problem, then, is to allocate the resources so as to satisfy all of the constraints and, simultaneously, to maximize the payoff, i.e., minimize the costs or maximize the benefits.

One method of representing such allocation decision problems is called the linear programming model. Such a model consists of a number of linear expressions that represent the quantitative relationships among allocations, constraints and payoffs. An expression is said to be linear if it is the sum of constant coefficients multiplied by unknown allocation values. Many resource allocation problems, of course, cannot be represented by such linear expressions, but involve higher powers of the unknowns or other nonlinearities in the relationships and hence are not susceptible to linear programming approaches.

It should be noted that the resource allocation problems discussed above are real physical problems arising in real physical systems. While it is true that significant quantitative aspects of the physical problem can be represented by the linear programming model, the purpose of this model is to provide optimum values which are then used in the physical world to construct or operate a physical system. Linear programming models are typically used to design telephone systems, to schedule airline activities or to control petro-chemical processes.

The feasible solutions to linear programming problems are often modelled as a multidimensional geometric shape—a polyhedron with a surface made up of thousands of multisided planes or "polygons" based on the constraints of the problem. This polyhedron, which is technically termed a "polytope," is an organized representation of the problem's constraints.

To find an optimum solution from among the many feasible solutions of a linear programming problem, an algorithm or procedure is applied. Such procedures follow an imaginary line or path from point to point in or on the surface of the polytope. The points on this path are steps in a series of interim solutions to the problem. Each such step is called an iteration. Each step or iteration, in turn, consists of the processing of equations that consider many interrelated constraints and variables.

It has long been known that the optimum solution to any linear programming problem must lie at one of the corners or vertices of the polytope. Successful algorithms or procedures for determining the optimum solution therefore follow a path which ultimately terminates at the optimum vertex. The speed of such algorithms depends, in part, on the number of steps and also, in part, on the complexity of each step.

One new method for solving linear programming models of physical allocation problems is called the Karmarkar algorithm, described in the article by N. K. Karmarkar entitled "A New Polynomial-Time Algorithm for Linear Programming," Combinatoria 4(4), pp. 373-395, 1984. Unlike the oler Simplex algorithm, which proceeds on the surface of the constraint polytope from vertex to vertex, the Karmarkar algorithm begins in the interior of the constraint polytope and proceeds in radial steps to the optimum vertex. At each iteration of the Karmarkar algorithm, the polytope space is rescaled to place the current value of the allocation at the polytope center. Because of the radial nature of successive steps, far fewer steps are required to reach the optimum vertex and hence the Karmarkar algorithm presents the possibility of being much faster than the Simplex algorithm, particularly for larger-sized problems.

One problem in using the Karmarkar algorithm is the necessity to invert a complicated matrix product for each step or iteration of the algorithm. If this matrix product is not a relatively sparse matrix, the inversion process can require an excessive amount of time. Such dense matrix products will arise if the constraint matrix of the linear programming model has only one or a few dense columns, due to the matrix multiplication process. The increased amount of time necessary to invert such dense matrices must be expended on each and every iteration of the Karmarkar algorithm, thereby often placing an unacceptable slow-down in the time required to utilize the Karmarkar algorithm for solving linear programming models.

SUMMARY OF THE INVENTION

In accordance with the illustrative embodiment of the present invention, the Karmarkar algorithm is modified so as to be able to handle constraint matrices with a small number of dense columns. In general, the modification involves partitioning the constraint matrix into sparse columns and dense columns and using a perturbation formula which quickly inverts the resulting matrix product.

More specifically, the modified Karmarkar algorithm which can handle dense constraint columns provides a computationally efficient method for inverting the necessary matrix products. Since the generation of such matrix inversions is computationally the most difficult part of each step of the Karmarkar algorithm, the methods and apparatus of the present invention provide a faster overall solution for linear programming models.

In a very general sense, the computational efficiencies of the present invention arise from a judicious decomposition of the constraint matrix into dense portions and sparse portions so as to move the dense portions away from the matrix inversion. Since the bulk of the computation time is tied up in matrix inversions, any substantial reduction in the time required for matrix inversions results in substantial improvement in the solution time, and hence the cost, of applying the Karmarkar algorithm.

DETAILED DESCRIPTION

The newly available Karmarkar algorithm for making optimum resource allocations with a linear programming model will first be discussed, and thereafter the modifications of the Karmarkar algorithm necessary to permit handling dense columns in the constraint matrix will be taken up.

Figure 1:
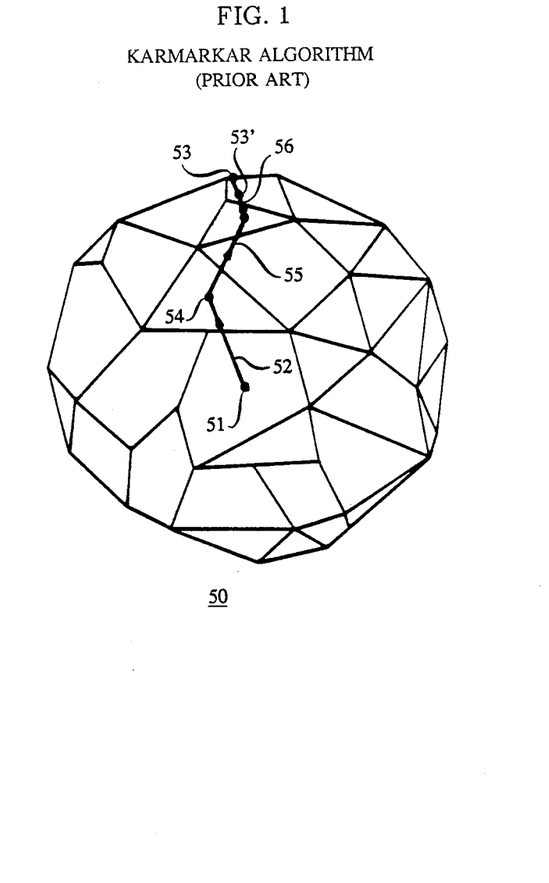
FIG. 1 is a graphical representation of the Karmarkar method for determining optimum resource allocations in linear programming models.

Before proceeding to a formal mathematical statement of the Karmarkar algorithm, a brief description of a graphical representation of the algorithm is in order. Referring more particularly to FIG. 1, there is shown a graphical representation of a convex, multidimensional polytope 50 which represents graphically the sum total of the constraints of a linear programming model. Each facet of polytope 50 in FIG. 1 is a partial plane which represents one linear constraint. The number of constraints is at least as large as the number of facets, while the number of unknown variables corresponds to the number of dimensions of the space in which polytope 50 exists. In FIG. 1, only three dimensions are represented because of the inherent limitations of human perception. The number of dimensions (variables) in practical linear programming models, however, can be hundreds, thousands and even millions.

In accordance with the Karmarkar algorithm, disclosed and claimed in the copending application of N. K. Karmarkar, Ser. No. 725,342, filed Apr. 19, 1985, now U.S. Pat. No. 4,744,028, and assigned to applicant's assignee, a starting point 51, located in the interior of polytope 50, is selected. As is well known, all points in the interior and on the surface of polytope 50 represent feasible solutions to the linear programming model. Also as is well known, in the absence of degeneracy, the optimum solution lies at one vertex of polytope 50, e.g., vertex 53. The Karmarkar algorithm proceeds radially entirely in the interior of polytope 50, in steps 52, 55, 56 ... to successive points 54, et cetera, each closer to optimum point 53. Since the Karmarkar algorithm proceeds radially in the interior of polytope 50 instead of circumferentially on the surface, from vertex to vertex, as does the Simplex algorithm, the Karmarkar algorithm is inherently faster because it requires many fewer steps, particularly for larger models. The Karmarkar algorithm takes steps in the direction of the decreasing cost gradient in the polytope interior. Moreover, the Karmarkar algorithm involves rescaling the polytope space to equalize or centralize the distance of each successive point in the trajectory or path from all of the facets of polytope 50, thereby normalizing the effect of the cost gradient in all of the dimensions of the polytope.

The formal statement of a linear programming model takes the form of an objective function which is to be maximized or minimized, and a plurality of constraint relationships which expresses the physical constraints on acceptable allocations. These constraints correspond to, and represent, as accurately as possible, the actual physical constraints present in the physical system. In standard vector notation, a typical linear programming model is expressed as follows:

Find a vector x of length n to $$\begin{aligned} \text{Minimize:} \quad & c \cdot x \\ \text{Subject To:} \quad & Ax = b \\ \text{and} \quad & x \geq 0 \end{aligned} \quad (1)$$

where $c = (c_1, c_2, \ldots, c_n)$ is a vector of cost coefficients, the operation "$\cdot$" represents the vector dot product, $x = (x_1, x_2, \ldots, x_n)$ is a vector of allocation values, n is the number of such allocation values, $A = (a_{11}, a_{12}, \ldots, a_{ij}, \ldots, a_{mn})$ is an m by an n matrix of constraint coefficients, and $b = (b_1, b_2, \ldots, b_m)$ is a vector of m constraint limits.

In the canonical Karmarkar form of the linear programming model, the values of the components of x (the allocation values) are constrained to be non-negative values, but other limits are possible. All objective functions and all constraint relationships can be reduced to this form by simple algebraic manipulation. "Greater than or equal to" constraints can, for example, be changed to "equality" constraints by adding artificial "surplus" variables to the constraint matrix. Similarly, "less than or equal to" constraints can be changed to "equality" constraints by adding artificial "slack" variables. These techniques are well known in the prior art.

The Karmarkar algorithm can be summarized as follows, using a highly compact vector notation. At each step of the iterative procedure, the algorithm computes a dual vector $\omega$. This vector is completely analogous to the vector of dual variables generated by the Simplex algorithm and used for sensitivity analysis. In accordance with the Karmarkar algorithm, the vector w is rescaled in accordance with the formula:

$$w = (AD_x^2 A^T)^{-1} A D_x^2 c. \quad (2)$$

The direction z of the step to the next set of allocation values is given by $$z = D_x^2(c - A^T w) \quad (3)$$

where, in equations (2) and (3), $D_x$ is the diagonal matrix of the current allocation values.

Using these values of $\omega$ and z, the complimentary slackness coefficient $\gamma$ can be defined as $$\gamma = \max z_i / x_i \quad (4)$$

and the dual feasibility coefficient can be defined as $$\delta = -\min z_i / x_i^2. \quad (5)$$

If M is defined as the maximum value of the $x_i$, one heuristic stopping criteria can be defined as follows. If $$\gamma + M\delta < (\epsilon/n)(|c \cdot x| + 1), \tag{6}$$

then stop, where $\epsilon$ is an arbitrarily small error measure and n is the number of variables x. If inequality (6) is not satisfied, a step is taken in the direction z from the current allocation x to get a new allocation, i.e., $$x \leftarrow x - \alpha z/\gamma \tag{7}$$

where $0 < \alpha < 1$ is a fixed value much like that defined by Karmarkar. Using the new allocation values, the algorithm calls for returning to equation (2) and continuing the iteration until inequality (6) is satisfied. Once inequality (6) is satisfied, the primal objective value is given by $c \cdot x$ and the dual objective value is given by $\omega \cdot b$.

If the allocation problem requires a maximization model, then the step direction z of equation (3) is negated. If the lower bound is nonzero, then x is replaced by $(x-l)$ in the matrix $D_x$ and in equations (4) and (5), where $l$ is the lower bound, and $D_x$ is as defined in connection with equation (3). If, in addition, the upper bound u is finite, then x is similarly replaced by $(u-x)$ or $(x-l)$ in the matrix $D_x$ and in equations (4) and (5).

Figure 2:
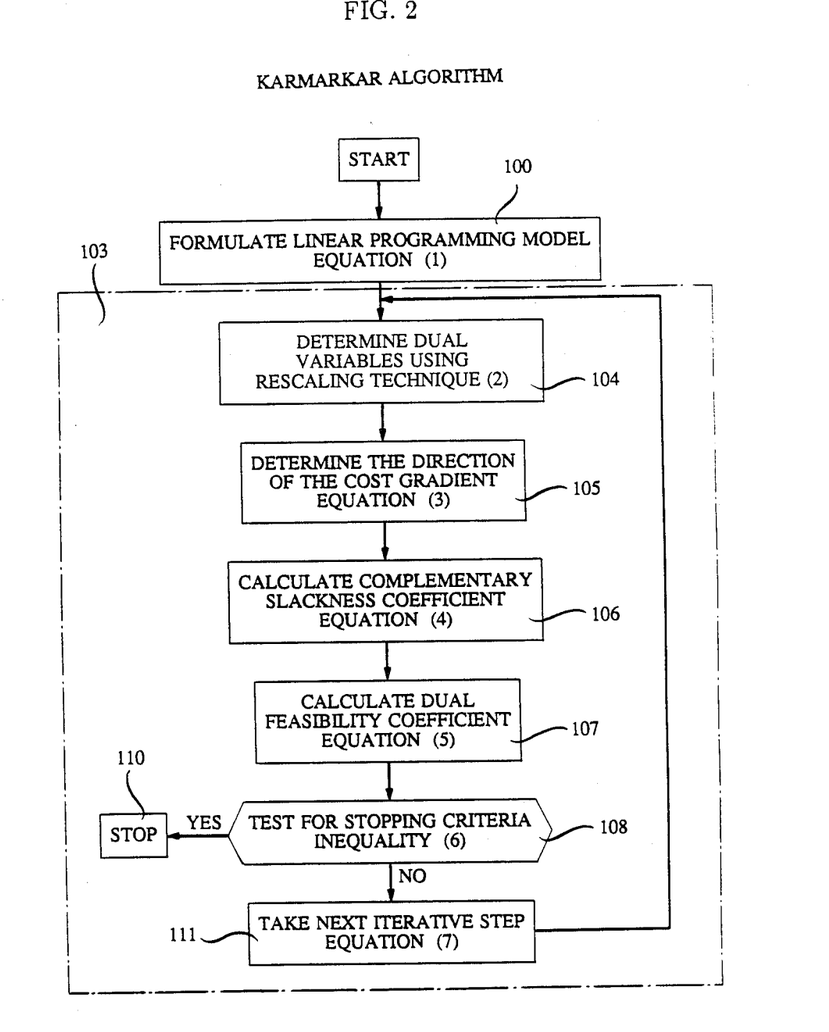
FIG. 2 is a general flowchart of the Karmarkar method for solving linear programming models.

A flowchart for the basic Karmarkar algorithm is shown in FIG. 2 of the drawings. As shown in FIG. 2, it is first necessary to formulate the linear programming model in box 100. A strictly feasible starting point x is then selected and used as the starting point for the iterative procedure in dashed box 103. Techniques for selecting the strictly feasible starting point are well known and will not be discussed here. The balance of FIG. 2, contained in dashed box 103, is the iterative portion of the procedure in accordance with the Karmarkar algorithm.

Iterative procedure 103 of FIG. 2 comprises the following steps. Given a strictly feasible allocation of the components of x:

(1) In box 104, determine the dual variable $\omega$ using the rescaling matrix $D_x$ in accordance with equation (2);
(2) In box 105, calculate the direction of steepest descent of the cost (objective) function according to equation (3);
(3) In box 106, calculate the complementary slackness coefficient in accordance with equation (4);
(4) In box 107, calculate the dual feasibility coefficient in accordance with equation (5);
(5) In decision box 108, test the current values of the variables in accordance with the stopping criteria of inequality (6);
(6) If the stopping criteria is satisfied in decision box 108, terminate in box 110;
(7) If the stopping criteria is not satisfied in decision box 108, step in the direction of the negative gradient of the objective function in accordance with equation (7) in box 111, set the current allocation to the new allocation value, and reenter box 104.

In the following pages, the basic Karmarkar algorithm, described above in connection with FIG. 2, will be modified so as to handle dense columns in the constraint matrix A. The significance of even one dense column in the matrix A is that the expression $(AD_x^2A^T)$ then becomes completely dense, i.e., has virtually no zero entries. Such a dense matrix is relatively slow to invert, and, since equation (2) requires its inversion on every iteration of the algorithm, a dense column causes the entire Karmarkar algorithm to become extremely slow. In accordance with the present invention, a perturbation formula is used which permits rapid inversion of the expression $(AD_x^2A^T)$ in the presence of dense columns.

In order to derive the perturbed version of the Karmarkar algorithm in accordance with the present invention, it is first necesssary to restate the linear programming model so as to partition the constraint matrix into sparse and "non-sparse," i.e., dense, columns:

$$\begin{aligned} \text{Minimize:} \quad & c \cdot x \\ \text{Subject To:} \quad & [SN] = b \\ \text{and} \quad & x \geq 0 \end{aligned} \tag{8}$$

where S represents the sparse columns of the A constraint matrix, N represents the non-sparse columns of the A matrix, and the diagonal matrix D is likewise partitioned into sparse and non-sparse values corresponding to the sparse and non-sparse columns, i.e., $$D_x = \begin{bmatrix} D_S & 0 \\ 0 & D_N \end{bmatrix} \tag{9}$$

Using the partitioned constraint matrix, it can be seen that $$AD^2A^T = SD_S^2S^T + ND_N^2N^T. \tag{10}$$

Equation (10) can be inverted using the relationship $$(AD^2A^T)^{-1} = (SD_S^2S^T)^{-1}$$
$$(SD_S^2S^T)^{-1}N(D_N^{-2} + N^T$$
$$(SD_S^2S^T)^{-1}N)^{-1}N^T(SD_S^2S^T). \tag{11}$$

It will be noted that equation (11) does not require the inversion of the dense partition N of the A constraint matrix. The inversion of $AD^2A^T$ can therefore be done relatively quickly and hence each iteration of the algorithm can likewise be done quickly. The only condition that must be met is that $(SD_S^2A^T)$ must have the same row rank as $(AD_x^2A^T)$.

The modified Karmarkar algorithm can be summarized as follows, using the same compact vector notation as used above. At each step of the iterative procedure, the dual vector $\omega$ is calculated from the formula:

$$\omega = \{(SD_S^2S^T)^{-1} - (SD_S^2S^T)^{-1}N(D_N^{-2} + N^T(SD_S^2S^T)^{-1}N^T(SD_S^2S^T)\}AD_x^2c. \tag{12}$$

where S is the sparse partition of the constraint matrix A, and N is the non-sparse partition of the constraint matrix A. The direction z of the step to the next set of allocation values is given by $$z = D_x^2(c - A^T\omega) \tag{13}$$

wherein, in equation (13), $D_x$ is the partitioned diagonal matrix of the current allocation values as shown in equation (9).

Using these values of $\omega$ and z, the complimentary slackness coefficient $\gamma$ is given, as before, by $$\gamma = \max z_i/x_i \quad (14)$$

and the dual feasibility coefficient is given by $$\delta = -\min z_i/x_i^2 \quad (15).$$

If M is defined as the maximum value of the $x_i$, the stopping criteria is again defined as follows. If $$\gamma + M\delta < (\epsilon/n)(|c \cdot x| + 1), \quad (16)$$

then stop, when $\epsilon$ is an arbitrarily small error measure and n is the number of variables x. If inequality (16) is not satisfied, a step is taken in the direction z from the current allocation x to get a new allocation, i.e., $$x \leftarrow x < \alpha z/\gamma \quad (17)$$

where $0 < \alpha < 1$ is a fixed value much like that defined by Karmarkar. Using the new allocation, the algorithm calls for returning to equation (12) and continuing the iteration until inequality (16) is satisfied. Once inequality (16) is satisfied, the primal objective value is given by $c \cdot x$ and the dual objective value is given by $\omega \cdot b$.

If the problem requires a maximization model, then the step direction z of equation (12) is negated. If the lower bound is non-zero, then x is replaced by $(x-l)$ in the matrix $D_x$ and in equations (14) and (15), where l is the lower bound. If the upper bound u is finite, then x is replaced by $(u-x)$ or $(x-u)$ in the matrix $D_x$ and in equations (14) and (15).

Figure 3:
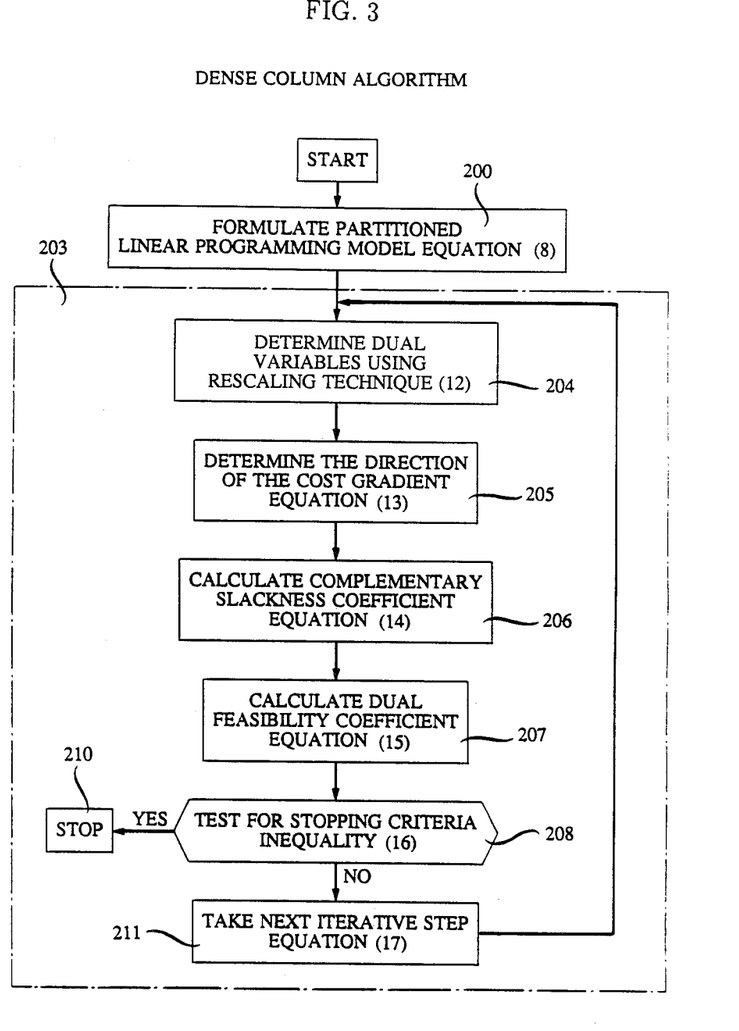
FIG. 3 is a flowchart of a modified Karmarkar algorithm modified to partition the constraint matrix so as to eliminate dense outer products in accordance with the present invention.

A flowchart for the modified Karmarkar algorithm is shown in FIG. 3 of the drawings. As shown in FIG. 3, it is first necessary to formulate the linear programming model in box 200. A strictly feasible starting point x is then selected and used as the starting point for the iterative procedure in dashed box 203. Techniques for selecting the strictly feasible starting point are well known and will be further discussed here. The balance of FIG. 3, contained in dashed box 203, is the iterative portion of the procedure in accordance with the modified Karmarkar algorithm.

Iterative procedure 203 of FIG. 3 comprises the following steps. Given a strictly feasible allocation of the components of x:

(1) In box 204, partition the constraint matrix into sparse and non-sparse portions, and determine the dual variable $\omega$ using the rescaling matrix $D_x$ in accordance with equation (12);
(2) In box 205, calculate the direction of steepest descent of the cost (objective) function according to equation (13);
(3) In box 206, calculate the complementary slackness coefficient in accordance with equation (14);
(4) In box 207, calculate the dual feasibility coefficient in accordance with equation (15);
(5) In decision box 208, test the current values of the variables in accordance with the stopping criteria of inequality (16);
(6) If the stopping criteria is satisfied in decision box 208, terminate in box 210;
(7) If the stopping criteria is not satisfied in decision box 208, step in the direction of the negative gradient of the objective function in accordance with equation (17) in box 211, set the current allocation to the new allocation value, and reenter box 204.

The modified Karmarkar algorithm derived above leads to an extremely efficient methodology in the presence of dense columns in the constraint matrix. Such dense columns occur in certain classes of linear programming problems in which a single or a few allocation values are very heavily dependent on all or most of the constraint values. Such a situation arises, for example, in problems where an artificial variable is added that has coefficients consisting of simple functions of values on the right-hand side.

Figure 4:
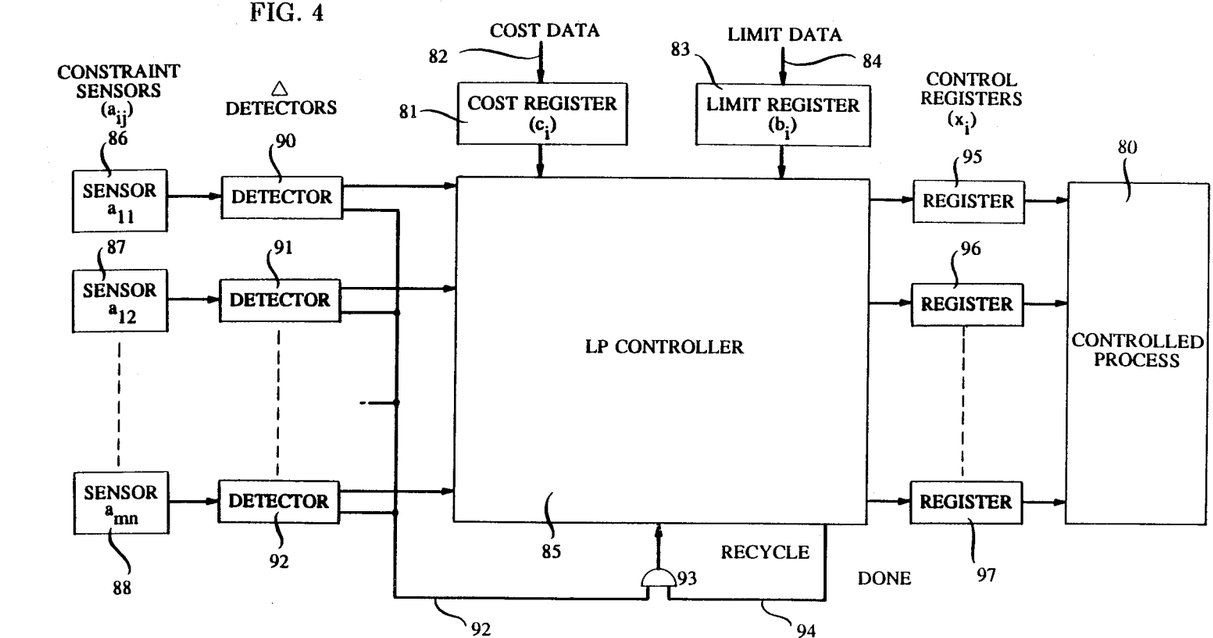
FIG. 4 is a block diagram of a resource allocation system using the methods of FIG. 3 to control resource allocations.

In FIG. 4 there is shown a process control system which controls a process 80. Process 80 may be a telephone communications system, a manufacturing process, a navigation process, or any other industrial or technological process which is to be optimized. A cost register 81 receives cost data on leads 82 representing the per unit costs of the various possible allocations of resources in controlled process 80. Cost data may be entered into register 81 from a computer terminal or from separate processes which dynamically determine these costs. While this cost data normally changes relatively slowly, there is nevertheless the ability to update this data via input leads 82 whenever necessary. If there are non-zero limits on the solution values, these limits, like the cost data, must be provided to LP controller 85 by way of a data input register like register 81.

Similarly, a limit register 83 is provided to store a representation of the total physical limits on each specific resource allocation. These limits are likewise relatively static and can be entered via leads 84 into register 83 from a computer terminal or from a separate limit-determining process. The outputs of registers 81 and 83 are applied to a linear programming (LP) controller 85 which carries out the process summarized in the flowchart of FIG. 3. LP controller 85 is, in the preferred embodiment, a programmed digital computer having stored therein the program which implements the flowchart of FIG. 3. Controller 85 may also comprise a complex of hardwired circuits designed to carry out the procedures of FIG. 3, a plurality of parallel processors to take advantage of the possibilities for parallel execution of the procedure, or a plurality of programmed linear arrays programmed for this purpose.

A plurality of constraint sensors 86, 87, . . . , 88 are provided to dynamically sense the constraint coefficients for the constraint relationships. Constraint sensors 86–88 are continually responsive to changes in the environment of controlled process 80, which changes affect the constraint relationships and hence, must be tracked in order to control process 80. Each of constraint sensors 86–88 has a corresponding change (delta) detector 89, 90, . . . , 91 which senses changes in the output of each of the respective sensors 86–88. A change-indicating signal from each of detectors 89–91 is applied to change bus 92 and thence to AND gate 93. Also applied to AND gate 93 is a signal from LP controller 85 on lead 94 indicating the termination of the execution of the procedure. The outputs from sensors 86–88 are applied through detectors 89–91, respectively, to controller 85.

In operation, the outputs of sensors 86–88 are used by controller 85 as the coefficients of the constraint matrix A of equation (8). The cost data in register 81 are used as the cost vector (c) in equation (8) and the limit data in register 83 are used as the limit vector (b) of equation (8). Given these inputs, LP controller 85 is able to carry out the procedure of FIG. 3 and provide digital solution values (x's) to control registers 95, 96, . . . , 97. The values in registers 95–97 are then used to control process 80.

Since LP controller 85 of FIG. 4 utilizes the extremely rapid procedures of FIG. 3, control values are available for registers 95–97 in a very short time. Moreover, as the constraints change, these changes are sensed by sensors 86–88, detected by detectors 89–91, and used to partially enable AND gate 93. When the procedure of FIG. 3 is complete, LP controller 85 generates control signals and transfers them to registers 95–97 and, simultaneously, generates an enabling signal on lead 94 to AND gate 93, completing the enablement of AND gate 93. The entire process is then repeated.

Depending on the complexity of the problem (the number of constraints sensed by sensors 86–88) and the stability of process 80, it is possible to more or less continually control process 80 by this method. Indeed, if the rate of change of the environmental factors sensed by sensors 86–88 is equal to or less than the rate of operation of LP controller 85, the process 80 will be controlled continuously. Higher rates of changes in the environment will introduce granularity into the control process, but will still permit near optimum operation, on the average, of the process 80. Indeed, given some history of the environmental changes, some predictive mechanism can be built into detectors 89–91 to predict the direction and magnitude of future changes in the outputs of sensors 86–88.

A typical type of problem in the telecommunications field to which the present invention can be applied is described in two articles in *The Bell System Technical Journal*, Vol. 60, No. 8, October 1981. A first article entitled "Design and Optimization of Networks with Dynamic Routing" by G. R. Ash et al. (p. 1787) describes the general telephone traffic routing problem while the second article, entitled "Servicing and Real-Time Control of Networks with Dynamic Routing," also by G. R. Ash et al. (p. 1821) describes an auxiliary problem of minimizing idle capacity due to erroneous predictions of traffic loads.

Other problems which would benefit from the new procedures herein described include industrial process control, deployment of personnel to provide customer services, blending of ingredients to form commercial products, oil refinery product mix, assignments of computer resources to a plurality of users, and many others. In each case, the cost (or benefit) coefficients must be measured or otherwise determined, the constraint limits must be established and the contributions of all of the decision variables to these constraints also measured or determined. The result of executing the procedures is, in each case, the specification of a set of control parameters which, when applied to the real world situation, will produce an optimum process or apparatus.

It should be noted that the matrices involved in most practical linear programming models are sparse matrices and that many known sparse matrix techniques can also be used in evaluating the search direction z in FIG. 3.

While the present inventor has constructed significant improvements on the Karmarkar method for solving linear programming models, it is to be understood that the claims of this invention relate only to the application of these novel improvements to arrangements that determine the optimum allocation of resources in real world technological and industrial systems that lend themselves to a linear representation of the variables and constraints characterizing the system, i.e., physical arrangements that determine how resources are actually applied to optimize the performance of processes, machines, manufactures or compositions of matter. All other uses of the new method, such as computation research, algorithm research, or linear algebra research activities, form no part of the present invention. Similarly, use of the new method in non-technological or non-industrial systems likewise forms no part of the present invention. While the specification above employs mathematical notations to describe a new method for determining and adjusting values of system parameters, it is to be understood that the claims of this invention relate only to the method and apparatus that achieve this determination and adjustment. More specifically, the claims relate to a method and apparatus for determining and controlling the operational state of a commercial system so as to optimize the operational state of that system. In the context of this invention, a commercial system is a system that employs physical resources. Such a commercial system processes resources, incurs monetary (or equivalent) costs, and produces monetary (or equivalent) income. In such commercial systems, an optimized state of the system corresponds to a system state that optimizes a chosen attribute. Often, that chosen attribute is minimum attainable monetary costs incurred by the commercial system, of minimum attainable expenditure of the physical resources. All other uses of the method, such as mere computations to solve a given mathematical problem, computation research, algorithm research, or linear algebra research activities, are not encompassed by the claims appended hereto, and are not to be so construed. Similarly, the use of this new method on a non-technological or non-commercial systems likewise form no part of the present invention.

What is claimed is:

1. A method for allocating available industrial facilities among users of said facilities, subject to constraints on said allocations, to minimize the total cost of providing said facilities, said method starting with a initial tentative facilities assignment and comprising the steps of:

tentatively assigning said available facilities to said users in accordance with a specified deterministic process to form a tentative facilities assignment characterized by a total cost that is lower than the cost of preceding tentative facilities assignments;

repeating said step of tentatively assigning when said total cost fails to meet a preselected criterion; and allocating said facilities in accordance with the last of said tentative facilities assignments when said total cost meets said preselected criterion;

wherein said allocations to said users and said available industrial facilities form linear constraint relationships; and said preselected deterministic process is a modified Karmarkar algorithm wherein each said assignment is determined by normalizing the previous assignment with respect to constraints on said allocations, during each said assignment, forming a tentative facilities assignment by (a) separating said constraint relationships into a sum of a first subset of constraint relationships and a second subset of constraint relationships, where said first subset of constraint relationships corresponds to those users that affect a number of said constraints in excess of a preselected proportion of said constraints, and said second subset of constraint relationships corresponds to the remaining users, and (b) separately operating on said subsets of constraint relationships in the course of said assignment.

2. The allocation method according to claim 1 wherein said final step of allocating said facilities is preceded by the steps of:

utilizing the last of said tentative facilities assignment in claim 1 as the initial assignment of facilities in a further allocation of said facilities to minimize a different cost criteria, and repeating the steps of claim 1 using said different cost criteria.

3. The allocation method according to claim 1 wherein said assigning step further includes the step of assigning at each iteration, both the cost minimizing (primal) allocations and the equivalent maximizing (dual) allocations of said facilities.

4. An optimized resource allocation system comprising:

a first plurality of physical resources available for use,
a second plurality of resource users using said physical resources; and
a controller for assigning said resource users to said physical resources so as to minimize the cost of providing said resources, said controller including
first means for iteratively and tentatively selecting feasible ones of said assignments in accordance with a preselected process until preselected stopping criteria are met,
second means for allocating said physical resources in accordance with a final one of said tentative assignment; and
third means for including the effect on successive selections of partitioning the users into a set of users that employ a number of said physical resources in excess of a preselected proportion of said physical resources, and a set of users that corresponds to the remaining ones of said users;
wherein
said first means of said controller constrains each of said feasible assignments to be represented within the interior of a normalized multidimensional convex feasible solution space.

5. A system for optimizing the performance of a controlled process in accordance with an optimizing criterion, said system comprising:

process control devices for controlling said process in response to variable control signal sets,
a plurality of sensors for sensing variable conditions affecting the operation of said process,
a plurality of data input devices for prescribing conditions affecting the operation of said process, and
a linear programming controller responsive to said sensors and said input devices for providing optimized control signal sets to said process control devices in accordance with the Karmarkar algorithm,
said controller including means for identifying successive tentative strictly feasible control signal sets including means for separating sparsely and non-sparsely constrained ones of said variable control signals, and means for selecting each of said successive tentative control signal set along the steepest gradient of a normalized version of said optimizing criteria.

6. The system according to claim 5 wherein said controlled process is a process of assigning transmission facilities in a telecommunications network.

7. The system according to claim 5 wherein said controlled process is a process of manufacturing a number of products.

8. The system according to claim 5 wherein said controlled process is a process of controlling the the deployment of industrial equipment.

9. The system according to claim 5 wherein said controlled process is an inventory control process.

10. A method for allocating industrial or technological resources, $x_j, j=1,n$, among a plurality of resource users subject to constraints $$\sum_j A_{ij}x_j = b_i, i = 1,2,\ldots,m, x_j \geq 0, j = 1,2,\ldots,n,$$

to optimize a cost function $$\sum_j c_j x_j,$$

said method comprising the steps of:

tentaively allocating said available resources to said resource users in accordance with a specified deterministic process to form a tentative resource allocation characterized by a total cost that is lower than the cost of preceding tentative resource allocations;

repeating said step of tentatively allocating when said total cost fails to meet a preselected criterion; and allocating said resource in accordance with the last of said tentative resource allocations when said total cost meets said preselected criterion;

wherein said step of tentatively allocating includes the steps:

(a) partitioning said constraints into sparse and non-sparse subsets S and N, respectively, of a constraint matrix, $A = [a_{ij}]$, (b) selecting an initial allocation x meeting said constraints, (c) determining a dual variable w in accordance with the formula $$w = \{(SD_S^2S^T)^{-1} - (SD_S^2S^T)^{-1}N(D_N^{-2} + N^T(SD_S^2S^T)^{-1}N)^{-1}N^T(SD_S^2S^T)^{-1}\}AD_x^2c,$$

where S is the submatrix of A corresponding to sparse columns of A, where a column $j_o$ is sparse when the number of nonzero elements in column $j_o$ is less than a preselected proportion of the total number of elements $a_{ij_o}$ for $i = 1, 2, \ldots, m$, N is the submatrix of A corresponding to the non-sparse columns, $D_x$ is a diagonal matrix containing the elements of the current allocation vector x, $D_S$ is a diagonal matrix containing those elements of the current allocation vector x that correspond to the sparse columns, and $D_N$ is a diagonal matrix containing those elements of the current allocation vector x that correspond to the non-sparse columns, (d) determining the direction of the next iteration of an iterative procedure for approximating said optimal cost in accordance with the formula $$z = D_x^2(c - A^Tw),$$

where $D_x$ is the diagonal matrix of the current allocation values given by $$D_x = \begin{bmatrix} D_S & O \\ O & D_N \end{bmatrix},$$

(e) determining a complementary slackness coefficient $\gamma$ of said current iteration from the formula $$\gamma = \max_j z_j/x_j, \text{ and}$$

(f) determining a dual feasibility coefficient $\delta$ of said current iteration from the formula $$\delta = -\min_j z_j/x_j^2,$$

wherein said step of returning to said step of tentatively allocating allocating includes the steps:

(g) testing said current iteration against the inequality $$\gamma + M\delta < (\epsilon/n)(|c \cdot x| + 1),$$

where $$M = \max_j x_j$$

and $\epsilon$ is an arbitrary small error measure, (h) if the test of step (g) is not satisfied, returning to step (c) with the new allocations $$x \leftarrow x - \alpha z/\gamma,$$

where $\alpha$ is an arbitrary real number strictly between zero and one, and wherein said step of allocating allocates said resources in accordance with said current allocation when the test of step (g) is satisfied.

11. A method for allocating available industrial facilities, b, among users of said facilities, where the allocations, $x \geq 0$, to said users and said available industrial facilities form linear constraint relationships, $Ax=b$, and said allocations are selected so as to minimize the total cost, $c \cdot x$, of providing said facilities, said method comprising the step of:

tentatively and iteratively assigning said available facilities to said users in accordance with the Karkmarkar algorithm so as to reduce said total costs at each said assignment, each said assignment being determined by normalizing the previous assignment with respect to said constraints on said allocations, during each said assignment, adjusting the previous assignments by grouping said set of constraint relationships $Ax=b$ into a sum of a first subset of constraint relationships and a second subset of constraint relationships, $N+S$, where $A=[NS]$, where said first subset of constraint relationships, N, corresponds to those users that affect a number of said constraints in excess of a preselected proportion of said constraints, and said second subset of constraint relationships, S, corresponds to the remaining users, and operating on said subsets of constraint relationships individually in the course of said assignment, terminating said iterative assigning steps when said costs are minimized, and allocating said facilities in accordance with the minimum cost assignment after the last one of said steps of tentatively and iteratively assigning.

* * * * *